US010289839B1

(12) United States Patent
Bedekar et al.

(10) Patent No.: US 10,289,839 B1
(45) Date of Patent: May 14, 2019

(54) SYSTEMS AND METHODS FOR PREVENTING UNAUTHORIZED ACCESS TO COMPUTING DEVICES IMPLEMENTING COMPUTER ACCESSIBILITY SERVICES

(71) Applicant: Symantec Corporation, Mountain View, CA (US)

(72) Inventors: Rachana Bedekar, Culver City, CA (US); Hai Zhao, Culver City, CA (US); Jiajia Liu, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 119 days.

(21) Appl. No.: 15/277,597

(22) Filed: Sep. 27, 2016

(51) Int. Cl.
*G06F 21/55* (2013.01)
*G06F 21/60* (2013.01)
*G06F 3/0488* (2013.01)
*G06F 3/0484* (2013.01)

(52) U.S. Cl.
CPC ........ *G06F 21/554* (2013.01); *G06F 3/04883* (2013.01); *G06F 21/604* (2013.01); *G06F 3/04842* (2013.01)

(58) Field of Classification Search
CPC ....... G06F 21/31; G06F 21/554; G06F 21/604
See application file for complete search history.

(56) References Cited

U.S. PATENT DOCUMENTS

2007/0192859 A1* 8/2007 Shahar ................ G06F 21/552
  726/22
2016/0103988 A1* 4/2016 Caron ................. H04L 63/0815
  726/8

OTHER PUBLICATIONS

"Shabtai et al., Intrusion detection for mobile devices using the knowledge-based, temporal abstraction method, 2010, The Journal of Systems and Software, 83, pp. 1524-1537" (Year: 2010).*
"Accessibility Clickjacking"—The Next Evolution in Android Malware that Impacts More Than 500 Million Devices [update—1.34 Billion Devices!], https://www.skycure.com/blog/accessibility-clickjacking/, (Mar. 3, 2016).
Accessibility: Touch Access, https://www.chromium.org/user-experience/touch-access, (Sep. 7, 2016).
AccessibilityService, https://developer.android.com/reference/android/accessibilityservice/AccessibilityService.html, (Sep. 7, 2016).
(Continued)

*Primary Examiner* — Dao Q Ho
(74) *Attorney, Agent, or Firm* — FisherBroyles, LLP

(57) ABSTRACT

The disclosed computer-implemented method for preventing unauthorized access to computing devices implementing computer accessibility services may include (i) detecting, at a client computing device, an instruction to perform a user interface action utilizing a computer accessibility service, (ii) determining, at the client computing device, whether the instruction was triggered based on a touch event initiated by a user of the client computing device, and (iii) performing, at the client computing device, a security action in response to determining that the instruction was not triggered based on a touch event initiated by the user. Various other methods, systems, and computer-readable media are also disclosed.

17 Claims, 6 Drawing Sheets

(56) References Cited

OTHER PUBLICATIONS

How Android Accessibility Services Can Be Used to Hack Your Phone, http://www.makeuseof.com/tag/android-accessibility-services-can-used-hack-phone/, (May 14, 2016).

Malware may abuse Android's accessibility service to bypass security enhancements, http://www.symantec.com/connect/blogs/malware-may-abuse-android-s-accessibility-service-bypass-security-enhancements, (May 4, 2016).

* cited by examiner

SYSTEMS AND METHODS FOR PREVENTING UNAUTHORIZED ACCESS TO COMPUTING DEVICES IMPLEMENTING COMPUTER ACCESSIBILITY SERVICES

BACKGROUND

Accessibility services are invaluable to many users with disabilities or other impediments that prevent them from fully interacting with their electronic devices. Such, accessibility services may assist users by audibly reading displayed content (e.g., emails, web pages, selectable objects, etc.) to users, transcribing audible user input into text, and executing various actions in response to audible user commands. In order to interact with devices, such accessibility services must have access to content displayed on a screen. Additionally, accessibility services must be able to execute various actions on devices on behalf of the user without the user providing user input through conventional techniques (e.g., interactive screen input, keyboard input, mouse input, etc.).

Unfortunately, because accessibility services often operate in the background, devices using such accessibility services may be vulnerable to malicious attacks that exploit the accessibility services to make unauthorized changes to the devices without a user's knowledge or consent. For example, a user may unknowingly grant broad permissions to a malicious application enabling the malicious application to make unauthorized changes to a user computing device. An accessibility service running on a device may be exploited to automatically install malicious applications on a device, to grant dangerous device permissions to malicious applications, or to disable security applications on a device without a user's knowledge. Additionally, applications that are not necessarily malicious may utilize accessibility services to make changes on user devices that negatively impact the performance or functionality of the devices. The instant disclosure, therefore, identifies and addresses a need for systems and methods for preventing unauthorized access to computing devices implementing computer accessibility services.

SUMMARY

As will be described in greater detail below, the instant disclosure describes various systems and methods for preventing unauthorized access to computing devices implementing computer accessibility services.

In one example, a computer-implemented method for preventing unauthorized access to computing devices implementing computer accessibility services may include (i) detecting, at the client computing device, an instruction to perform a user interface action utilizing a computer accessibility service, (ii) determining, at the client computing device, whether the instruction was triggered based on a touch event initiated by a user of the client computing device, and (iii) performing, at the client computing device, a security action in response to determining that the instruction was not triggered based on a touch event initiated by the user.

In some examples, performing the security action may include (i) blocking, at the client computing device, performance of the user interface action, (ii) notifying, at the client computing device, the user that the instruction to perform the user interface action was detected, or (iii) requesting, at the client computing device, that the user provide input either authorizing or rejecting the user interface action. Performing the security action may further include performing, at the client computing device, the user interface action when input received from the user authorizes the user interface action, or blocking, at the client computing device, performance of the user interface action when input received from the user rejects the user interface action. In at least one example, performing the security action may include identifying, at the client computing device, a malicious computer process that generated the instruction to perform the user interface action.

In certain examples, determining whether the instruction was triggered based on a touch event initiated by the user may include operating the client computing device in an exploration mode that prevents the client computing device from performing the user interface action. The computer-implemented method may further include exiting, at the client computing device, the exploration mode after receiving input from the user authorizing the user interface action.

In one embodiment, the user interface action may include an interaction with at least one element of a user interface presented on a display of the client computing device. For example, the user interface action may include at least one of a click event and a gesture event. In some examples, the touch event initiated by the user may be generated in response to an interaction between the user and at least one element of a user interface presented on a display of the client computing device.

In one embodiment, a system for implementing the above-described method may include (i) a detection module, stored in memory, that detects, at a client computing device, an instruction to perform a user interface action utilizing a computer accessibility service, (ii) a determination module, stored in memory, that determines, at the client computing device, whether the instruction was triggered based on a touch event initiated by a user of the client computing device, (iii) a security module, stored in memory, that performs, at the client computing device, a security action in response to determining that the instruction was not triggered based on a touch event initiated by the user, and (iv) at least one physical processor configured to execute the detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a client computing device, may cause the client computing device to (i) detect, at the client computing device, an instruction to perform a user interface action utilizing a computer accessibility service, (ii) determine, at the client computing device, whether the instruction was triggered based on a touch event initiated by a user of the client computing device, and (iii) perform, at the client computing device, a security action in response to determining that the instruction was not triggered based on a touch event initiated by the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
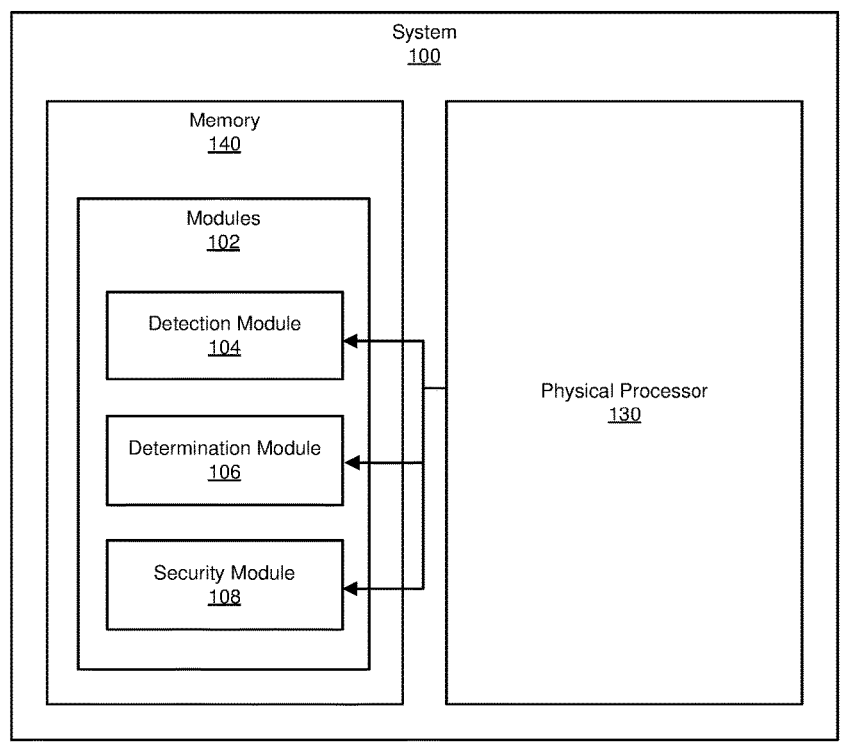
FIG. 1 is a block diagram of an example system for preventing unauthorized access to computing devices implementing computer accessibility services.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing unauthorized access to computing devices implementing computer accessibility services. As will be explained in greater detail below, by determining whether instructions to perform user interface actions on client computing devices are triggered based on touch events prior to executing the user interface actions, the systems and methods described herein may detect and prevent unauthorized access to the client computing devices by malicious applications. These systems and methods may allow users to authorize or block user interface actions that are attempted by applications utilizing accessibility services. The described systems and methods therefore give users greater awareness and control over their computing devices.

The systems and methods described herein may improve the functioning of client computing devices by allowing legitimate actions to be performed on the client computing devices and blocking malicious actions that would negatively impact the client computing devices through slowing or disabling the devices. By preventing malicious applications from accessing client computing devices, these systems and methods may also improve the security of the client computing devices and reduce time and resources expended to repair client computing devices that are compromised.

Figure 2:
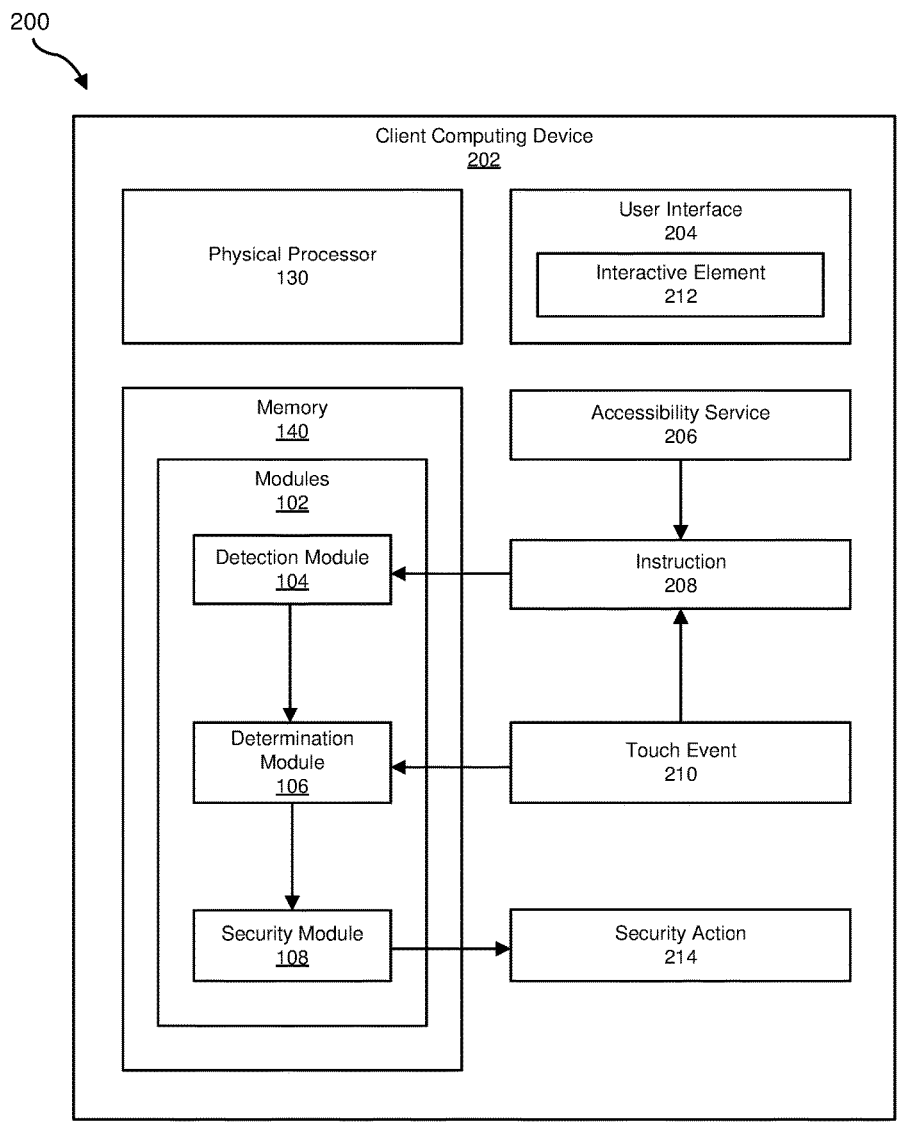
FIG. 2 is a block diagram of an additional example system for preventing unauthorized access to computing devices implementing computer accessibility services.

The following will provide, with reference to FIGS. 1-2, detailed descriptions of example systems for preventing unauthorized access to computing devices implementing computer accessibility services. Detailed descriptions of corresponding computer-implemented methods will also be provided in connection with FIG. 3. Detailed descriptions of an example system for preventing unauthorized access to computing devices implementing computer accessibility services will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of exemplary system 100 for preventing unauthorized access to computing devices implementing computer accessibility services. As illustrated in this figure, exemplary system 100 may include one or more modules 102 for performing one or more tasks. For example, and as will be explained in greater detail below, exemplary system 100 may include a detection module 104 that detects, at the client computing device, an instruction to perform a user interface action utilizing a computer accessibility service. Exemplary system 100 may additionally include a determination module 106 that determines, at the client computing device, whether the instruction was triggered based on a touch event initiated by a user of the client computing device. Exemplary system 100 may also include a security module 108 that performs, at the client computing device, a security action in response to determining that the instruction was not triggered based on a touch event initiated by the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the device illustrated in FIG. 2 (e.g., client computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing unauthorized access to computing devices implementing computer accessibility services. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. Although not illustrated in FIG. 2, client computing device 202 may be in communication with one or more other computing devices and/or servers via a network (e.g., an intranet, a Wide Area Network (WAN), a Local Area Network (LAN), a Personal Area Network (PAN), the Internet, Power Line Communications (PLC), a cellular network, etc.). In one example, all or a portion of the functionality of modules 102 may be performed by client computing device 202 and/or any other suitable computing device and/or system.

As will be described in greater detail below, one or more of modules 102 from FIG. 1 may, when executed by at least one processor of client computing device 202, enable client computing device 202, which is implementing a computer accessibility service 206, to prevent unauthorized access to client computing device 202]. For example, and as will be described in greater detail below, detection module 104 may detect, at client computing device 202, an instruction 208 to perform a user interface action, such as an action corresponding to an interactive element 212 of a user interface 204, utilizing the computer accessibility service. Determination module 106 may determine, at client computing device 202, whether instruction 208 was triggered based on a touch event 210 initiated by a user of client computing device 202. Security module 108 may perform, at client computing device 202, a security action 214 in response to determining that instruction 208 was not triggered based on a touch event initiated by the user.

Client computing device 202 generally represents any type or form of computing device capable of reading computer-executable instructions. Examples of client computing device 202 include, mobile computing devices having interactive touch screens, such as cellular phones (e.g., smartphones), Personal Digital Assistants (PDAs), tablets, laptops, and smart watches. Additional examples, of client computing device 202 include, without limitation, desktops, servers, Personal Digital Assistants (PDAs), multimedia players, wearable devices (e.g., smart glasses, etc.), embedded systems, gaming consoles, combinations of one or more of the same, exemplary computing system 510 in FIG. 5, or any other suitable computing device.

Figure 3:
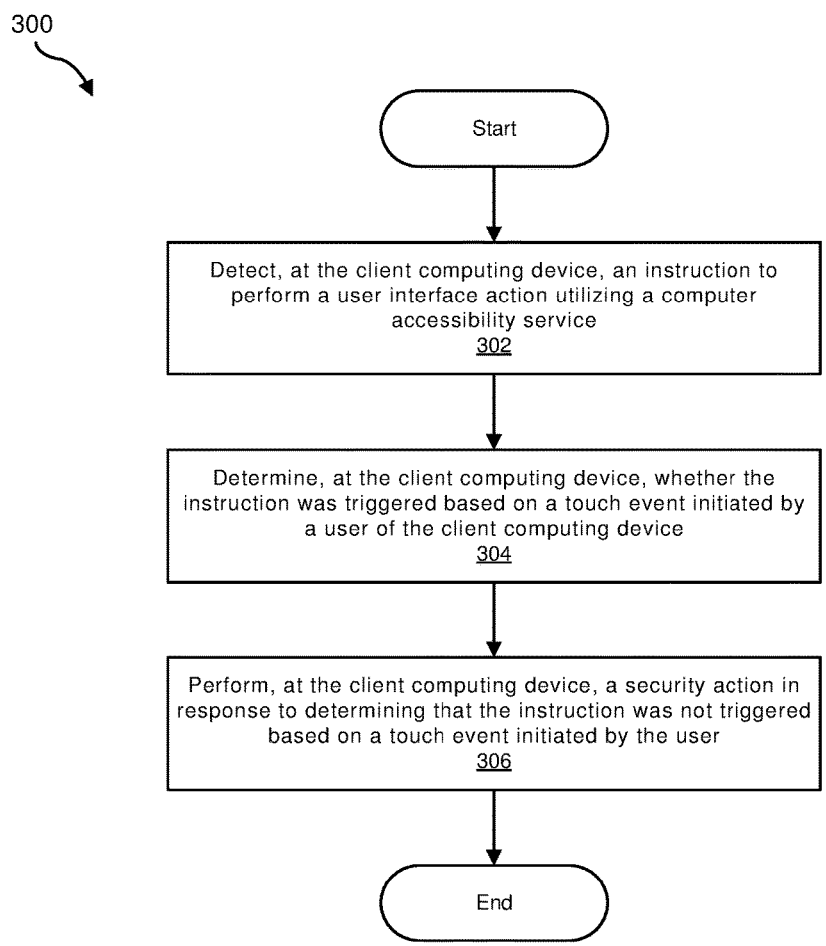
FIG. 3 is a flow diagram of an example method for preventing unauthorized access to computing devices implementing computer accessibility services.

FIG. 3 is a flow diagram of an example computer-implemented method 300 for preventing unauthorized access to computing devices implementing computer accessibility services. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, at the client computing device, an instruction to perform a user interface action utilizing a computer accessibility service. For example, detection module 104 may, as part of client computing device 202 in FIG. 2, detect, at client computing device 202, instruction 208 to perform a user interface action utilizing accessibility service 206.

As used herein, the term "application" generally refers to any computer program that causes a computing system to perform useful tasks. As used herein, the term "event" generally refers to any type or form of digital behavioral action or occurrence that may be generated, detected, responded to, and/or handled by an application. Examples of an event may include, without limitation, a system event, a network activity, a registry activity, a file activity, a process injection, or an API call.

As used herein, the terms "user interface" and "graphical user interface" (or "GUI"), generally refer to any application and/or portion of an application designed for user interaction and displayed on the screen of a computing device. In some embodiments, a user interface or GUI may include images and interactive graphical elements, such as buttons, icons, menus, text, labels and/or visual indicators, without limitation, that allow a user to perform actions on client computing device 202.

Detection module 104 may detect instruction 208 to perform a user interface action utilizing accessibility service 206 in a variety of contexts. For example, detection module 104 may detect a touch event that is representative of an instruction to perform an action related to user interface 204 presented by client computing device 202. According to at least one embodiment, client computing device 202 may present user interface 204 (e.g., a GUI) on a screen (e.g., screen 412 illustrated in FIG. 4) of client computing device 202. Accessibility service 206 may be an application that is installed on client computing device 202 and that runs in the background while client computing device 202 is used. Accessibility service 206 may be configured to carry out various actions on client computing device 202 without conventional interactive input from a user. For example, accessibility service 206 may be configured to receive audio input from a user that is identified by the accessibility service 206 as an instruction to select an interactive graphical element included in user interface 204.

An application, such as a malicious application, may be granted certain permissions to access client computing device 202 using accessibility service 206. In some embodiments, a user may not knowingly activate accessibility service 206 on client computing device 202. For example, a malicious application may trick a user into activating accessibility service 206 by presenting an interactive interface, such as a game, in a foreground display window on client computing device 202. The foreground window may be overlaid on a background interface that is not visible to the user, or that is at least partially obscured by the foreground window. The malicious application may direct the user to tap on various parts of the foreground window corresponding to the physical locations of certain interactive elements in the background interface. For example, the foreground window may display a game that encourages the user to tap on specific locations on the screen corresponding to interactive elements in the background interface, which the user is unaware of. In one example, such a background interface may comprise a menu that grants various permissions for an application to utilize accessibility service 206. As the user proceeds through the game, the user may unknowingly grant permissions allowing the malicious application to utilize accessibility service 206 to access client computing device 202.

Once the malicious application is granted such permissions, the malicious application may utilize accessibility service 206 to access and make changes to client computing device 202. In some embodiments, a malicious application may use accessibility service 206 to open a user interface, such as user interface 104, and select interactive elements, such as interactive element 212, within user interface 104. For example, a malicious application may open a webpage or an application store page (e.g., GOOGLE PLAY, ITUNES APP STORE, etc.) having a user interface that includes an interactive button that may be selected to download an application to client computing device 202. In some examples, a malicious application may open a user interface, such as a device settings menu, having interactive elements for changing settings on client computing device 202 and/or for forcing other applications running on client computing device 202 to close. In one example, a malicious application may access user interface 104 in the background so that a user of client computing device 202 is unaware of the unauthorized access.

A malicious application may then utilize accessibility service 206 to generate instruction 208 instructing client computing device 202 to perform a user interface action corresponding to user interface 104. Instruction 208 may be any type of instruction directing client computing device 202 to perform an action with respect to one or more interactive elements, such as interactive element 212, of user interface 204. For example, instruction 208 may comprise an interaction event (e.g., a click event, a double-click event, a swipe event, a gesture event, etc.) directing performance of an interaction with interactive element 212 of user interface 204. In some embodiments, such an interaction with interactive element 212 may initiate downloading of a software, such as an application, to client computing device 202. In various embodiments, the interaction with interactive element 212 may change one or more device settings on client computing device 202. In at least one example, the interaction with interactive element 212 may force one or more applications to stop running and/or may uninstall one or more applications on client computing device 202. In certain examples, the interaction with interactive element 212 may turn on and/or perform actions on one or more applications installed on client computing device 202. In at least one embodiment, detection module 104 may detect instruction 208 prior to carrying out the indicated user interface action with respect to user interface 204.

At step 304 in FIG. 3, one or more of the systems described herein may determine, at the client computing device, whether the instruction was triggered based on a touch event initiated by a user of the client computing device. For example, determination module 106 may, as part of client computing device 202 in FIG. 2, determine whether instruction 208 was triggered based on a touch event 210 initiated by a user of client computing device 202.

Determination module 106 may determine whether instruction 208 was triggered based on touch event 210 initiated by a user of client computing device 202 in a variety of contexts. In at least one embodiment, client computing device 202 may include sensors that detect and/or measure raw user touch interactions on a screen (e.g., screen 412 illustrated in FIG. 4) of client computing device 202. For example, a user may use their finger or another tool, such as a stylus, to interact with the screen of client computing device. Client computing device 202 may determine whether such raw user touch input triggers a touch event. For example, if the user interacts (e.g., clicks, double clicks, swipes, provides a gesture, etc.) with an interactive display element displayed on the screen of client computing device 202 using a finger or stylus, client computing device 202 may determine that the interaction satisfies criteria for a user interaction with the display element, and a touch event, such as touch event 210, may be generated by client computing device 202.

According to at least one embodiment, determination module 106 may monitor for touch events whenever accessibility service 206 is initialized. For example, when either an application or a user initializes accessibility service 206 for any purpose, determination module 106 may begin monitoring for touch events generated by client computing device 202. When a touch event, such as touch event 210, is identified by determination module 106, determination module 106 may determine whether touch event 210 occurred within a specified window of time relative to detection and/or receipt of instruction 208. In one example, determination module 106 may also determine whether touch event 210 occurred prior to detection and/or receipt of instruction 208.

According to some embodiments, determination module 106 may operate the client computing device 202 in an exploration mode (e.g., TouchExploration mode on an ANDROID operating system) in order to monitor for touch events whenever accessibility service 206 is initialized. When client computing device 202 is operated in exploration mode, client computing device 202 may generate touch events in response to user interaction with the screen of client computing device 202 without automatically performing a user interface action in response to the touch events. This allows determination module 106 to identify a touch event and determine whether it corresponds to instruction 208 before proceeding with further action related to the touch event.

In one embodiment, client computing device 202 may log touch events, and determination module 106 may determine whether a logged touch event corresponds to instruction 208 detected by detection module 104. For example, client computing device 202 may log touch events with a time stamp, and determination module 106 may determine whether a touch event having a time stamp that is within a specified window of time relative to detection and/or receipt of instruction 208 is logged at client computing device 202.

If determination module 106 determines that touch event 210 occurred within the specified window of time relative to instruction 208, determination module 106 may determine that instruction 208 was triggered based on touch event 210. Determination module 106 may then take no further action and may allow the interface action to be performed on client computing device 202 in accordance with instruction 208. If, however, determination module 106 determines that touch event 210 did not occur within the specified window of time, then determination module 106 may determine that instruction 208 was not triggered based on touch event 210.

At step 306, one or more of the systems described herein may perform, at the client computing device, a security action in response to determining that the instruction was not triggered based on a touch event initiated by the user. For example, security module 108 may, as part of client computing device 202 in FIG. 2, perform, at client computing device 202, a security action 214 in response to determining that instruction 208 was not triggered based on a touch event initiated by the user.

Security module 108 may perform security action 214 in a variety of contexts. In one example, security module 108 may perform security action 214 by blocking performance of the user interface action instructed by instruction 208. For example, security module 108 may prevent performance of the user interface action either temporarily (e.g., pending further user authorization for the user interface action) or permanently. In some embodiments, security module 108 may perform security action 214 by notifying a user of client computing device 202 that instruction 208 to perform the user interface action was detected. In additional embodiments, security module 108 may perform security action 214 by requesting that the user provide input either authorizing or rejecting the user interface action. Security module may additionally perform security action 214 by performing the user interface action instructed by instruction 208 when input received from the user authorizes the user interface action, or blocking the user interface action when input received from the user rejects the user interface action.

In at least one example, security module 108 may perform security action 214 by identifying a malicious computer application or process that generated instruction 208 to perform the user interface action. Security module 108 may further perform a disinfection routine to locate and eliminate any active and/or potential threats that may be associated with instruction 208. For example, security module 108 may determine that an application that generated instruction 208 may be uninstalled and/or disabled to prevent further malicious exploitation of accessibility service 206. After security action 214 is performed, security module 108 may end monitoring for touch events by determination module 106. For example, security module 108 may exit an exploration mode that is utilized to monitor for touch events on client computing device 202.

Figure 4:
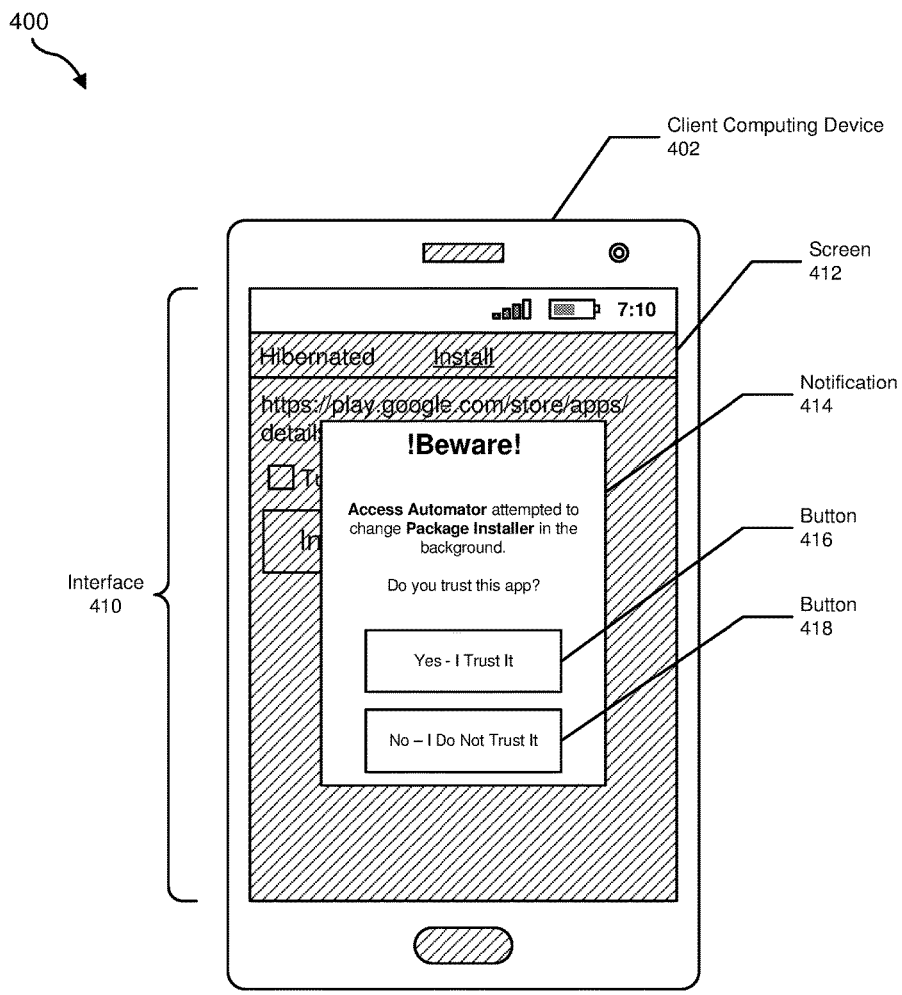
FIG. 4 is an illustration of an example system for preventing unauthorized access to computing devices implementing computer accessibility services.

To provide an example of a security action, FIG. 4 illustrates an example system 400. In one embodiment, example system 400 may include a client computing device 402 that is an interactive portable device, such as a smartphone. As shown in FIG. 4, system 400 may include a user interface 410 presented on a screen 412 of client computing device 402. System 400 may, within interface 410, display a notification 414 when it is determined, by any of the described method and systems, that an instruction utilizing an accessibility service on client computing device 402 was not triggered based on a touch event initiated by a user via screen 412. In some examples, notification 414 may be accompanied by additional alerting elements (e.g., an audible alert, a tactile alert via phone vibration, etc.) to induce the user to see notification 414. In some examples, elements of interface 410, including interactive elements, other than those displayed in notification 414 may be obscured, greyed out, darkened, and/or hidden by notification 414.

In some examples, notification 414 may contain an alert indicating that an attempted interface action was detected. For example, as illustrated in FIG. 4, notification 414 may indicate that an application, such as Access Automator, running on client computing device 402 attempted to perform a user interface action, such as changing a Package Installer application, in the background. Notification 414 may ask for user input prior allowing the user to continue to access client computing device 402. For example, notification 414 may include a button 416 and a button 418. A user may select button 416 through a click interaction if they wish to authorize the interface action to be performed on client computing device 402. For example, the user may trust the Access Automator application and may select button 416 allowing the Access Automator application to make the indicated change to the Package Installer application. Alternatively, the user may select button 418 through a click interaction if they do not wish to authorize the interface action to be performed on client computing device 402 because they do not trust the Access Automator application to make the indicated change to the Package Installer application. If the user selects button 418, system 400 may block the Access Automator application from making the indicated changes to the Package Installer application. After selecting either button 416 or button 418, the user may be permitted to continue using client computing device 402.

As explained above in connection with example method 300 in FIG. 3, the technology may actively prevent unauthorized access by malicious applications or other applications to a client computing device (e.g., a smartphone) that implements accessibility services (e.g., AccessibilityService provided on devices running an ANDROID operating system), even when such malicious applications are not first detected by a security service operating on the client computing device. The systems and methods described herein may detect an application's malicious behavior that utilizes accessibility services in the background at runtime on the client computing device.

By determining whether instructions to perform user interface actions on client computing devices are triggered based on touch events prior to executing the user interface actions, the systems and methods described herein may detect and prevent unauthorized access to the client computing devices by malicious applications. In some examples, when an accessibility service is initiated on a client computing device, the described systems and methods may request that the accessibility service be run in an exploration mode (e.g., TouchExploration mode on an ANDROID operating system). While running in the exploration mode, the client computing device may not automatically translate a user's raw touches on a screen of the client computing device into click events (e.g., click events, double-click events, swipe events, gesture events, etc.). Rather, the click events may be run through a security application that detects the click events and that may either allow or prevent the client computing device from performing actions associated with the click events In one example, the systems and methods described herein may detect an instruction, such as a click event (e.g., TYPE_VIEW_CLICKED), that directs the client computing device to perform a user interface action while the accessibility service is running on the client computing device. For example, an application, such as a malicious application, may exploit the accessibility service to access a user interface screen and attempt to instruct the client computing device to install one or more additional applications on the client computing device. In additional examples, an application may use the accessibility service to attempt to instruct the client computing device to change permissions settings, thereby granting itself or other applications dangerous permissions on the client computing device. In some examples, an application may use the accessibility service to attempt to instruct the client computing device to force stop one or more other applications running on the client computing device.

While in the exploration mode, the systems and methods described herein may determine whether a touch event (e.g., TYPE_TOUCH_INTERACTION_START) was generated in conjunction with the detected click event. For example, it may be determined whether a touch event occurred within a specified window of time relative to click event and/or whether a touch event occurred prior the click event. If the described systems and methods determine that a touch event occurred within the specified window of time relative to the click event, the described systems and methods may determine that the click event is based on a legitimate user interaction in which the user physically made an interface selection by touching the screen of the client computing device. At this point, the described systems and methods may exit the exploration mode and may allow an interface action to be performed on the client computing device in accordance with the click event. Additionally, the user may be allowed to proceed and interact with the client computing device as normal once the click event is determined to be based on the touch event.

If, however the touch event did not occur within the specified window of time relative to the click event, the described systems and methods may determine that the click event was sent by an application using the accessibility service. In this case, a security action may be performed in relation to the click event. For example, execution of a user interface action corresponding to the click event may be prevented and a notification may be sent to a user indicating that the interface action was attempted by an application and asking whether the user trusts the application. The user may then either allow the application to perform the user interface action associated with the click event or block the application from performing the action.

Accordingly, these systems and methods may give users greater awareness and control over their computing devices by allowing users to authorize or block user interface actions that are attempted by applications exploiting accessibility services running on the computing devices, even when the applications attempt to perform such actions in the background. The systems and methods described herein may also improve the functioning of client computing devices by allowing legitimate actions to be performed on the client computing devices and blocking malicious or otherwise unauthorized actions that would negatively impact the client computing devices by slowing or disabling the devices. For example, the systems and methods described herein may improve the functioning of a mobile phone and/or mobile computing devices (e.g., smartphones, tablets, etc.) that implement computer accessibility services. By preventing malicious applications from accessing client computing devices, these systems and methods may also improve the security of the client computing devices and reduce time and resources expended to repair client computing devices that are compromised due to malicious attacks.

Figure 5:
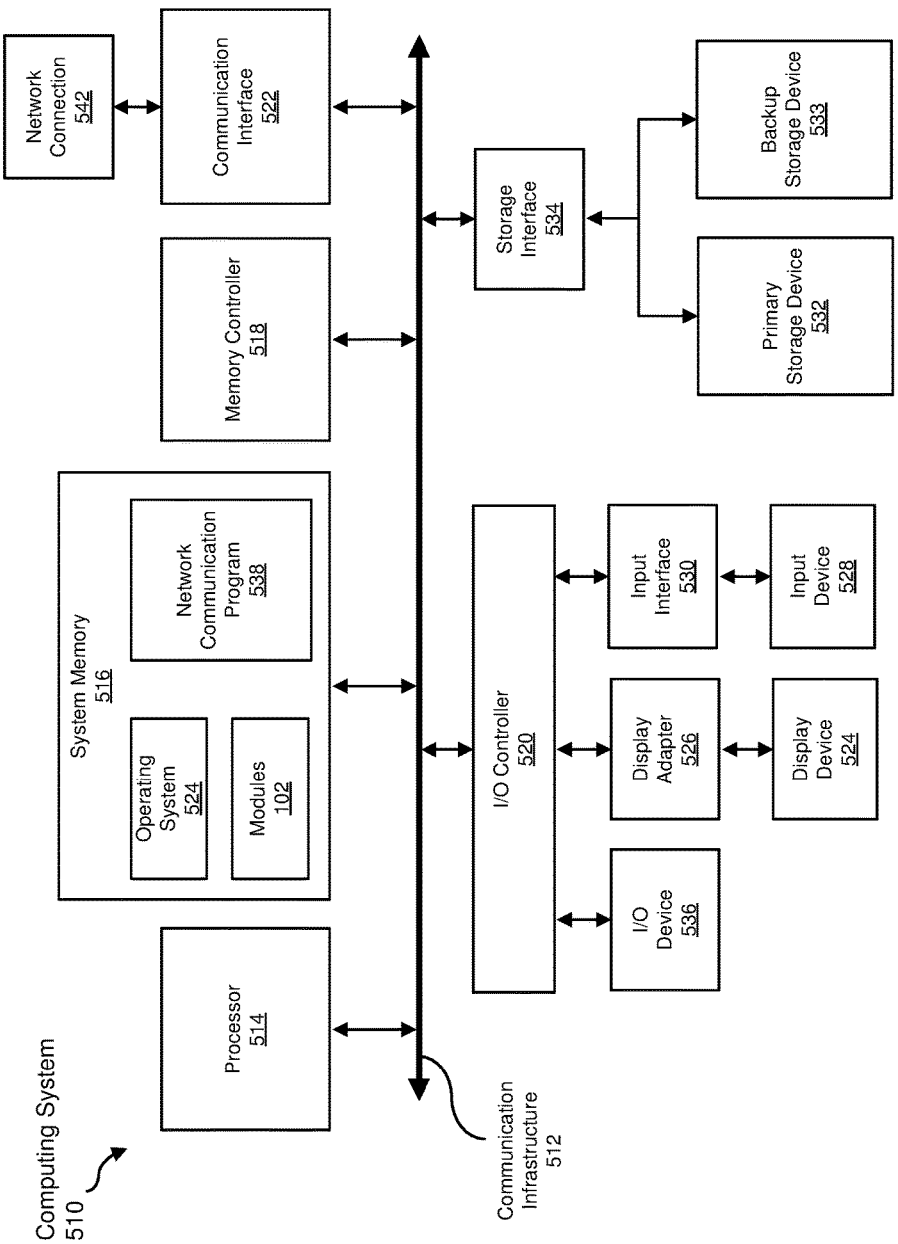
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
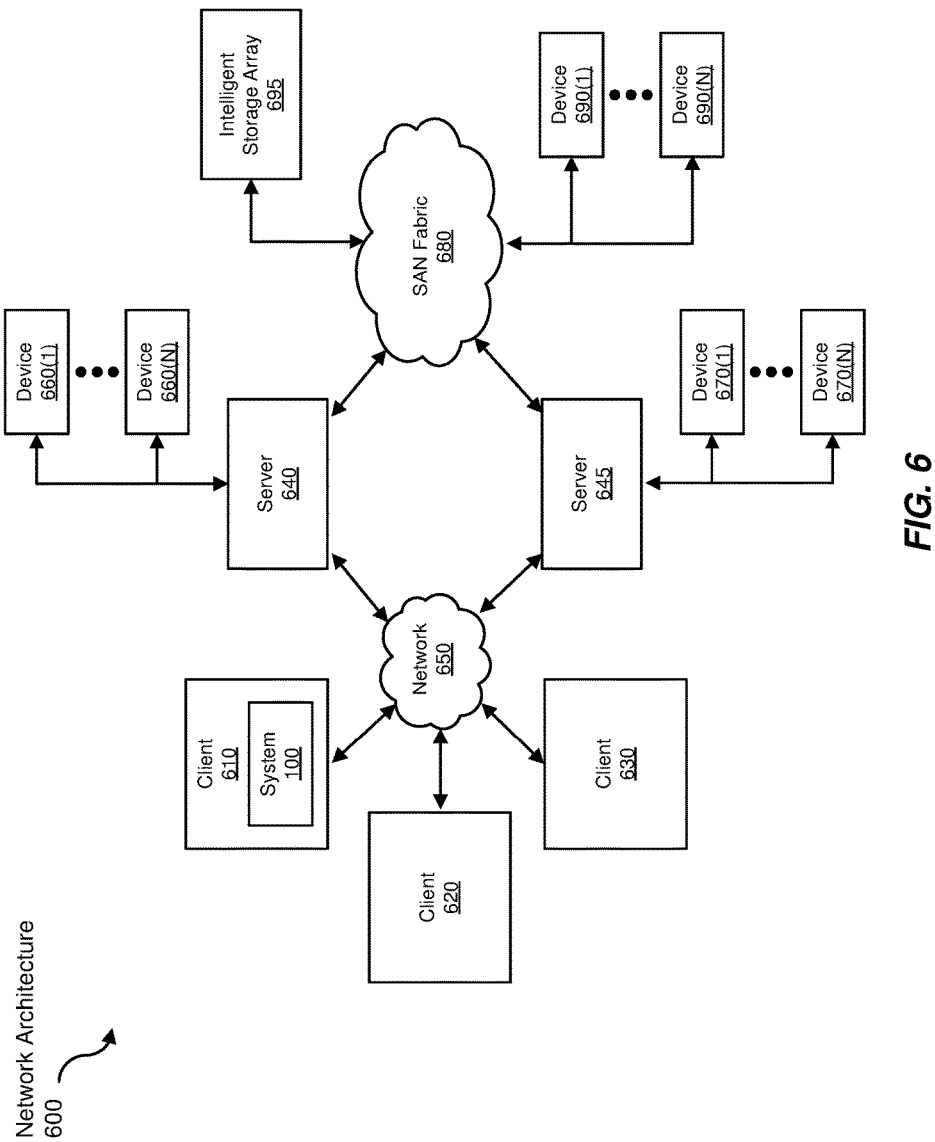
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for preventing unauthorized access to computing devices implementing computer accessibility services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive instruction data to be transformed, transform the instruction data by determining whether the instruction data was triggered based on a touch event, and use the result of the transformation to perform a security action in response to determining that the instruction was not triggered based on a touch event. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing unauthorized access to computing devices implementing computer accessibility services, at least a portion of the method being performed by a client computing device comprising at least one processor, the method comprising:
  detecting, at the client computing device, whether a computer accessibility service is initialized;
  initiating, at the client computing device in response to detecting that the computer accessibility service was initialized, an exploration mode to monitor for touch events initiated by a user of the client computing device;
  detecting, at the client computing device during the exploration mode, an instruction to perform a user interface action utilizing the computer accessibility service, wherein the exploration mode prevents the client computing device from automatically performing the user interface action;
  determining, at the client computing device, whether the instruction was triggered based on a touch event initiated by the user of the client computing device;
  performing, at the client computing device, the user interface action in response to determining that the instruction was triggered based on a touch event initiated by the user; and
  performing, at the client computing device, a security action in response to determining that the instruction was not triggered based on a touch event initiated by the user; and
  exiting, at the client computing device, the exploration mode after receiving input from the user authorizing the user interface action.

2. The method of claim 1, wherein performing the security action comprises blocking, at the client computing device, performance of the user interface action.

3. The method of claim 1, wherein performing the security action comprises notifying, at the client computing device, the user that the instruction to perform the user interface action was detected.

4. The method of claim 3, wherein performing the security action further comprises requesting, at the client computing device, that the user provide input either authorizing or rejecting the user interface action.

5. The method of claim 4, wherein performing the security action further comprises:
  performing, at the client computing device, the user interface action when input received from the user authorizes the user interface action; or
  blocking, at the client computing device, performance of the user interface action when input received from the user rejects the user interface action.

6. The method of claim 1, wherein performing the security action comprises identifying, at the client computing device, a malicious computer process that generated the instruction to perform the user interface action.

7. The method of claim 1, wherein the user interface action comprises an interaction with at least one element of a user interface presented on a display of the client computing device.

8. The method of claim 1, wherein the user interface action comprises at least one of a click event and a gesture event.

9. The method of claim 1, wherein the touch event initiated by the user is generated in response to an interaction between the user and at least one element of a user interface presented on a display of the client computing device.

10. A system for preventing unauthorized access to computing devices implementing computer accessibility services, the system comprising:
  a determination module, stored in memory, that:
    detects, at a client computing device, whether a computer accessibility service is initialized; and
    initiates, at the client computing device in response to detecting that the computer accessibility service was initialized, an exploration mode to monitor for touch events initiated by a user of the client computing device;
  a detection module, stored in memory, that detects, at the client computing device during the exploration mode, an instruction to perform a user interface action utilizing the computer accessibility service, wherein:
    the exploration mode prevents the client computing device from automatically performing the user interface action;
    the determination module determines, at the client computing device, whether the instruction was triggered based on a touch event initiated by the user of the client computing device; and
    the determination module allows the client computing device to perform the user interface action in response to determining that the instruction was triggered based on a touch event initiated by the user;
  a security module, stored in memory, that:
    performs, at the client computing device, a security action in response to determining that the instruction was not triggered based on a touch event initiated by the user; and
    exits, at the client computing device, the exploration mode after receiving input from the user authorizing the user interface action; and
  at least one physical processor configured to execute the detection module, the determination module, and the security module.

11. The system of claim 10, wherein performing the security action comprises blocking, at the client computing device, the user interface action.

12. The system of claim 10, wherein performing the security action comprises notifying, at the client computing device, the user that the instruction to perform the user interface action was detected.

13. The system of claim 12, wherein performing the security action further comprises requesting, at the client computing device, that the user provide input either authorizing or rejecting the user interface action.

14. The system of claim 13, wherein performing the security action further comprises:
  performing, at the client computing device, the user interface action when input received from the user authorizes the user interface action; or
  blocking, at the client computing device, the user interface action when input received from the user rejects the user interface action.

15. The system of claim 10, wherein performing the security action comprises identifying, at the client computing device, a malicious computer process that generated the instruction to perform the user interface action.

16. The system of claim 10, wherein the user interface action comprises an interaction with at least one element of a user interface presented on a display of the client computing device.

17. A non-transitory computer-readable medium comprising one or more computer-readable instructions that, when executed by at least one processor of a client computing device, cause the client computing device to:
- detect, at the client computing device, whether a computer accessibility service is initialized;
- initiate, at the client computing device in response to detecting that the computer accessibility service was initialized, an exploration mode to monitor for touch events initiated by a user of the client computing device;
- detect, at the client computing device during the exploration mode, an instruction to perform a user interface action utilizing the computer accessibility service, wherein the exploration mode prevents the client computing device from automatically performing the user interface action;
- determine, at the client computing device, whether the instruction was triggered based on a touch event initiated by the user of the client computing device;
- perform, at the client computing device, the user interface action in response to determining that the instruction was triggered based on a touch event initiated by the user;
- perform, at the client computing device, a security action in response to determining that the instruction was not triggered based on a touch event initiated by the user; and
- exit, at the client computing device, the exploration mode after receiving input from the user authorizing the user interface action.

\* \* \* \* \*